United States Patent Office 2,965,830
Patented Dec. 20, 1960

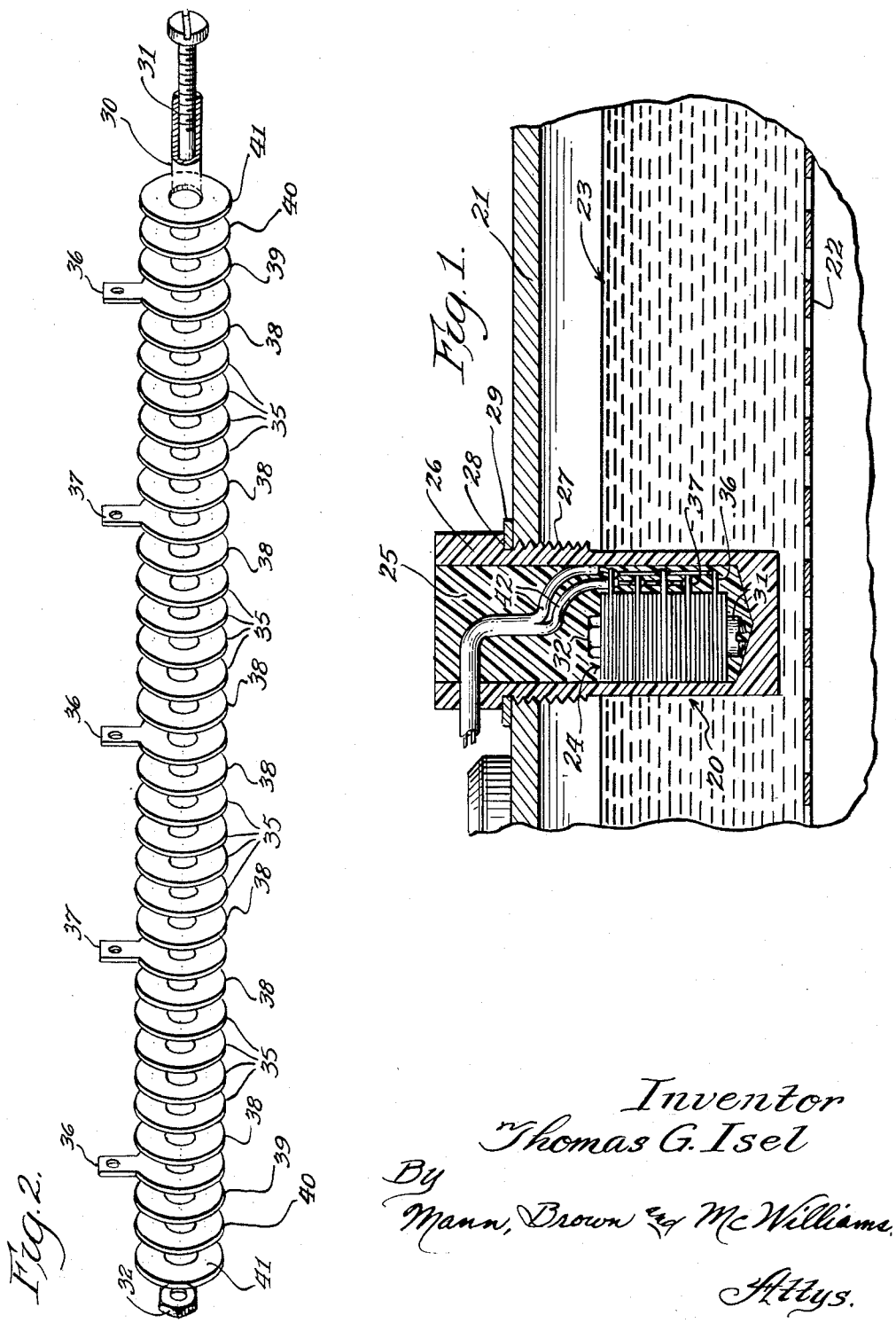

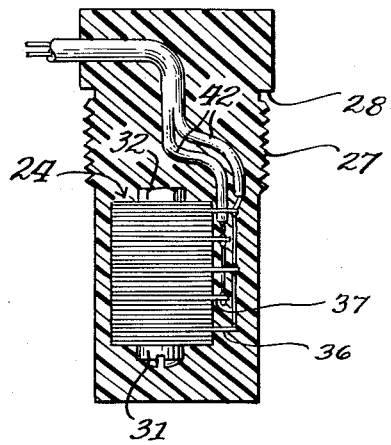
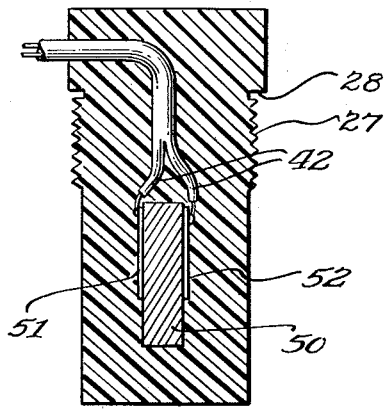
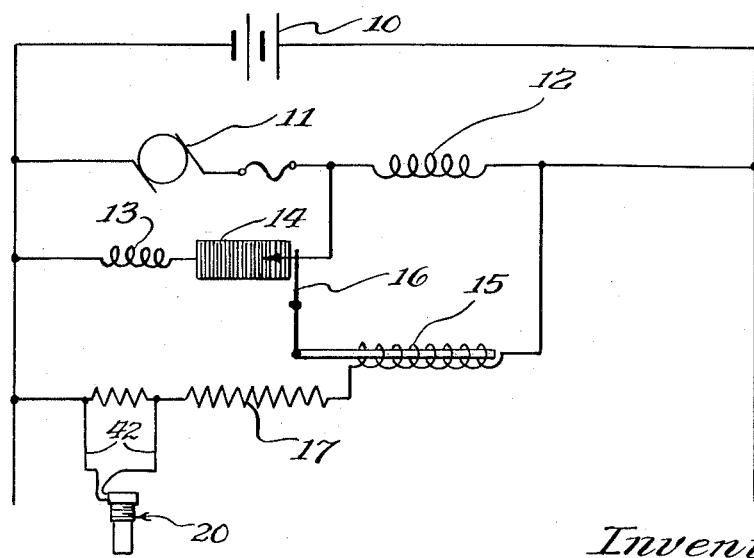

2,965,830

TEMPERATURE RESPONSIVE CONTROL FOR BATTERY CHARGING CIRCUIT

Thomas G. Isel, 9650 N. Le Claire Ave., Skokie, Ill.

Filed Dec. 17, 1956, Ser. No. 628,667

2 Claims. (Cl. 320—35)

This invention relates to an arrangement for controlling battery charging currents having regard to the effects of temperature upon the resistance value of the battery electrolyte and hence upon the value of the battery charging current. The invention is particularly concerned with the provision of a resistance element having a negative temperature coefficient and constructed for submergence in the battery electrolyte to respond to temperature changes and to loss of the electrolyte to modulate the battery charging current accordingly.

The principle of compensating a battery charging system for variations in the electrolyte temperature is old and the art is replete with various circuit arrangements and various detecting elements for applying this principle. However, until the present invention, no truly effective and reliable arrangement has been forthcoming. This failure has not resulted from any lack in incentive as there is a very real and unquestioned need for such a device. Tests have shown that battery life is seriously reduced either due to overcharging of the battery or due to a failure to maintain the battery fully charged. This fact is evidenced from a comparison of the useful lifetime of batteries in telephone central station service where the nature of the installations permits of carefully regulating the charging cycle with the useful lifetime of batteries on motive equipment such as railroad cars which are subjected to extremes of temperature and which until this time have had no adequate means for compensating for such changes.

It is the principal object of the present invention to provide a control arrangement that responds directly to the temperature of the battery electrolyte to modulate the charging voltage appropriately and maintain a substantially constant optimum charging current.

It is a further object to provide an arrangement that responds to loss of the battery electrolyte and automatically reduces the actual charging current to a lower constant value that is consistent and appropriate in view of the loss of electrolyte.

Generally speaking, this is accomplished by encapsulating a jacket of suitable corrosive-resistant, thermally conductive material about a thermistor element to permit the element to be submerged in the electrolyte in direct heat exchanging relationship and to provide the desired ruggedness and resistance to shock that allows these fragile elements to perform faithfully for a long period of time. The invention teaches the importance of correlating the size and resistance value of the thermistor element with its connection in the control circuit so that the electrolyte acts as a thermal sink and the internal heat generation does not upset the intended functioning of the arrangement. Furthermore, it is preferred to arrange the device in the circuit so that it "fails safe." Thus, if the thermistor element becomes short circuited, or open circuited, the remaining controls will function in their usual manner.

Other objects and advantages of the invention will become apparent during the course of the following description.

In the accompanying drawings forming a part of this specification and in which like numerals are employed to designate like parts throughout the same;

Fig. 1 is a fragmentary sectional view taken through a conventional storage battery and illustrating the thermistor element of the invention mounted in the battery casing and submerged in the battery electrolyte;

Fig. 2 is an exploded view of the preferred arrangement for constructing the thermistor;

Fig. 3 is a sectional view illustrating an alternative arrangement for encapsulating the thermistor element;

Fig. 4 is a sectional view similar to that of Fig. 3 but illustrating a composite thermistor element; and Fig. 5 is a circuit diagram illustrating the relevant parts of a typical battery charging control circuit and illustrating the preferred circuit connection of the thermistor element.

Referring now to the drawings and particularly to Fig. 5, the battery 10 is shown associated with the relevant parts of a typical battery charging control to which the present invention is applicable. This same type of circuit is commonly employed on railway cars for controlling the charging of the car's batteries and represents an important and advantageous form of the invention. As the description proceeds, it will become apparent that the teachings of the invention also find application to other battery charging control circuits.

The control circuit of Fig. 5 includes a generator 11 that develops a variable-voltage direct current output that is related to the speed of the car in which it is mounted. Actually, the generator is connected across the battery only when the car reaches a predetermined speed, and the circuitry for accomplishing this operation is so well known that it has been omitted for the sake of brevity.

As is conventional, the generator includes a shunt field 13 and the control circuit for the generator includes a current coil 12 in series with the generator, a carbon pile rheostat 14 in series with the shunt field 13, and a regulating circuit across both the current coil and the generator and comprising a voltage coil 15 mechanically actuating the carbon pile through a linkage 16 and a series resistance 17.

Conventionally, this circuit operates in the following manner. The generator speed varies as the speed of the prime mover varies and for increased prime mover speeds, the output voltage of the generator tends to increase but the current in the voltage coil tends to follow this increase and operates through the linkage 16 to loosen the carbon pile 14 thereby decreasing the generator field current and compensating for the increased prime mover speed with the result that the generator voltage remains substantially constant. Thus, the basic function of this regulator circuit is to maintain the battery charging current constant by maintaining the generator voltage constant.

In applications involving the regulation of railway car batteries, however, the batteries are exposed to extremes of temperature and as the electrolyte temperature varies, its resistance varies inversely. It is not at all unusual for the electrolyte temperature to range from as low as —20° F. to 122° F., though 77° has long been considered the normal value on which to base the regulator setting. As its temperature rises, the resistance of the electrolyte decreases and permits the battery charging current to rise to excessively high values. As its temperature decreases, the resistance of the electrolyte increases and the constant voltage is insufficient to fully charge the battery. Both extremes are damaging to the battery and are to be avoided.

Basically the control element 20 of the present invention is connected into the conventional battery charging circuit so that it modulates the generator voltage in response to changes in the temperature of the battery electrolyte and thus directly causes the charging current to remain at its predetermined optimum value irrespective of the fact that the temperature variations have altered the original circuit relationships by reason of the changes in the electrolyte resistance. This is accomplished by locating a temperature responsive resistance element in position to sense the temperature of the battery electrolyte and by connecting this element into the circuit so that it compensates for changes in the resistance of the electrolyte. Preferably the element 20 is actually submerged in the electrolyte and preferably it has a negative temperature coefficient of resistance so that it may be connected into the circuit as shown in Fig. 5. Resistance elements having a negative temperature coefficient of resistance are commonly known as "thermistors" and consist of various metallic oxides sintered at a high temperature to form a dense, stable ceramic material.

In this particular circuit the nominal generator voltage is 76 volts for an ambient temperature of 77°. The resistance of the voltage coil 15 is approximately 12 ohms and the series resistance 17 consists of a major portion of 65 ohms and a minor portion of 8 ohms. The thermistor is connected in parallel with the 8 ohm portion of the series resistance and the value of the thermistor ranges from approximately 24 ohms at 32° F. to 3.5 ohms at 150° F.

With the thermistor included in the circuit, as the electrolyte temperature rises and the resistance of the electrolyte falls, the charging current tends to increase since the generator voltage normally is held substantially constant as outlined above. However, the resistance value of the thermistor has also decreased since the rise in temperature of the electrolyte is communicated to the thermistor element. The decrease in the resistance of the thermistor permits increased current flow through the voltage coil 15 to loosen the carbon pile 14 and effect an appropriate decrease in generator voltage which compensates for the decrease in electrolyte resistance. In short, the conventional regulator circuit functions to maintain a constant generator voltage and this, of course, results in a constant charging current assuming no changes in circuit resistance. However, changes in ambient temperature do alter the electrolyte resistance but the thermistor portion of the circuit modulates the generator voltage in accordance with these temperature changes and thereby achieves a constant charging current.

The specific circuit arrangement of Fig. 5 has the advantage that a "fail safe" thermistor connection is employed. Thus the circuit will operate as a conventional battery charging regulator even should the thermistor element fail. If the thermistor should short circuit across the 8 ohm portion of the series resistance, the temperature compensating effect would, of course, be lost but the change in over-all circuit resistance is relatively minor and the primary voltage regulating action would be retained. Similarly, if the thermistor should "open circuit," the regulating function would still be retained though with slightly different characteristics.

Probably the most important aspect of the particular circuit connection resides in the fact that the current and heat dissipation characteristics, which must be provided by the thermistor element if it is to function without undesired self heating, can be accommodated by a thermistor element of appropriate resistance without exceeding the mounting and space restrictions created by the fact that the thermistor is submerged in the battery electrolyte. The present invention is believed to be the first instance where this result is achieved. A balancing of the following qualitative factors is involved. The resistance of the thermistor and its connection into the regulator circuit must be such that the changes in the resistance value of the thermistor produces an appropriate circuit effect and compensates for changes in the electrolyte resistance. The circuit location and resistance value of the thermistor must limit the heat generated by the thermistor to a value that can be dissipated by the electrolyte. This involves the efficiency of the thermal connection between the electrolyte and the thermistor. In addition the electrolyte must be capable of serving as a thermal sink for the heat generated by the thermistor. The arrangement of the present invention adequately fulfills these criteria so that the intended performance of the control unit is actually realized.

To permit of submerging the thermistor directly in the electrolyte the present invention teaches the encapsulation of the thermistor within a jacket of corrosion resistant thermally conducting material with the jacket being constructed for attachment to the battery casing. Various alternative embodiments of this arrangement for submerging the thermistor in the electrolyte are shown in Figs. 1 to 4.

In Fig. 1 the control element 20 is shown mounted in a battery that includes a cover plate 21 and a splash plate 22 with the battery electrolyte normally at the level 23. In this instance the thermistor element itself is indicated generally as 24 and it is completed and intimately encapsulated by a suitable epoxy resin 25 which in turn is surrounded by a jacket of polyethylene 26. Preferably the jacket is formed from a piece of 1½" diameter bar stock that is suitably bored to form a pocket that receives the thermistor assembly. The jacket is machined externally to provide the attaching threads 27 and sealing shoulder 28 that engage the cover plate 21. It is preferred to drill a special threaded opening through the battery cover 21 for receiving the jacket. As the jacket is screwed into place the shoulder 28 compresses an asphalt impregnated felt washer 29 across the outer surface of the battery cover to seal the unit in place.

The thermistor assembly shown at 24 in Fig. 1 is better illustrated in the exploded view of Fig. 2 where it may be seen that it consists of a plurality of wafers that are telescoped over an insulating sleeve 30 of phenolic material which in turn is telescoped over the shank of a through bolt 31 and held by a cooperating nut 32. The thermistor wafers themselves are indicated at 35 and are of the type sold by the Victory Engineering Corp., under Cat. No. 11XI, and, as will become apparent, they are arranged in four parallel sets with each set consisting of four thermistor wafers in series. To permit the arrangement to be connected in this manner, the terminals designated 36 are connected together to form one end of the unit while the terminals designated 37 are connected together to form the other end of the unit. The assembly also includes a plurality of lead washers 38, a pair of phenolic insulating washers 39, a pair of steel washers 40, and a pair of spring washers 41 at the opposite ends of the through bolt.

The parts of Fig. 2 are secured in snug relationship between the nut 32 and bolt 31 and a pair of terminal wires 42 are connected across the terminals 36 and 37 before the assembly is encapsulated within the jacket 26. This modular construction is versatile and flexible and permits the resistance and current capacity of the unit to be matched to the regulator circuit which the control element modifies. The encapsulation technique is highly advantageous in that the resultant unit is sturdy and readily able to withstand significant mechanical shocks. At the same time, the plastic material constitutes an adequate thermal connection between the thermistor elements themselves and the electrolyte. It has been found with this particular construction, connected, as shown, in the circuit of Fig. 5, that there results only a 2° F. temperature rise of the thermistor elements when the unit is submerged in the electrolyte. Thus, the electrolyte may properly be said to form a thermal sink for the thermistor elements. If the unit were merely exposed to the air there would be a 7° F. temperature rise.

An important feature of the present invention resides in the fact that the thermistor assembly of Fig. 2 is arranged in the battery such that the upper end of the assembly coincides with the normal electrolyte level 23 as shown in Fig. 2. Should the electrolyte level fall, the optimum value of charging current would be something less than the original value and the present invention actually brings about a decrease in the charging current when electrolyte is lost. As the electrolyte level falls, the upper portion of the thermistor assembly is exposed to the air rather than to the electrolyte and the electrolyte can no longer act as a thermal sink for the unit as a whole. Consequently, the temperature of the unit increases and its resistance decreases. The decrease in resistance draws a heavier current through voltage coil 15 which acts through the carbon pile 14 to lower the generator voltage and hence to lower the battery charging current in relationship to the falling electrolyte level. This compensation arises in part from the thermal characteristics of the encapsulating and jacket material which is not able to transmit all of the heat that is developed in the thermistor element unless the thermistor portion of the control element is completely submerged in the electrolyte. An important practical advantage is that the battery maintenance interval may be lengthened appreciably as the present invention results in a markedly decreased rate of use of the electrolyte. Maintenance on this type of equipment is an expensive and nonproductive activity but the automatic operation of the present unit sharply lowers the maintenance expense and frees man power for other more productive activity.

Fig. 3 illustrates an alternative embodiment of the control element where the thermistor assembly of Fig. 2 is encapsulated in a comparable manner except that the encapsulation material itself forms the corrosive resistant jacket which is machined, as before, to provide the attaching surface 27 and the shoulder 28. In this instance the assembly is encapsulated in an epoxy resin formulation produced by The Epoxylite Corporation of El Monte, California under the designation Epoxylite #205–6. This is a proprietary compound that provides high resistance to sulfuric acid and is based upon commercial grades of diglyeidyl ether of dihydroxydiphenydimethylmethane filled with inorganic fillers and cured with a polyfunctional carboxylic acid anhydride. Methyl methacrylate could also be used.

Thermistor materials are made in various forms other than the wafer or washer form shown herein and the present invention, while preferring the wafer form, contemplates that various of these other forms such as beads, rods, disks, etc., might also be encapsulated and submerged in the electrolyte to accomplish the same general purpose. The elongated form of the invention meets the space requirements and has the added advantage of compensating for electrolyte loss but the principal of encapsulating these materials for this application may profitably be employed in the case of these other forms whether elongated or not.

Fig. 4 illustrates an alternative embodiment wherein a vertical cylindrical rod 50 of thermistor material is provided with silver contact surfaces 51 and 52 which are fired onto the ceramic body on opposite arcuate sides thereof. This composite form eliminates many of the assembly steps required in the modular construction of Figs. 1 to 3 though individual design is required to relate the size of the composite unit to the resistance and current carrying characteristics required by its circuit connection. The technique of encapsulation is again important from the standpoint of mechanical strength and also from the standpoint of providing a jacket having thermal characteristics that cooperate to permit the thermistor to compensate automatically for loss of electrolyte.

It should be understood that the description of the preferred form of the invention is for the purpose of complying with Section 112, Title 35 of the United States Code, and that the appended claims are to be construed as broadly as the prior art will permit.

I claim:

1. The combination with a regulated battery-charging system including a variable voltage direct current source, means connecting said source in charging relation across a battery, and means connecting a control circuit across said source for regulating the battery-charging current, said control circuit including a coil connected for sensing and regulating the output voltage of said source and a current-limiting series resistance, the arrangement being such that a change in a given direction in the output voltage of said source causes a like change in the current through said coil to cause the coil to act upon said source so as to oppose said change; of means for compensating for temperature changes of electrolyte in said battery and including a temperature-responsive resistance element having an inverse temperature-resistance coefficient, means for mounting said element in chemically isolated heat-conducting relationship with said electrolyte to position the element with its top end substantially at the level of the electrolyte so that when the electrolyte temperature changes in a given direction, tending to produce a corresponding change in battery-charging current, the temperature of said element follows the temperature change of the electrolyte and correspondingly changes the current through said coil to regulate the output voltage of said source in a direction opposite to the direction of said electrolyte temperature change, and means connecting said element in parallel with a portion of said series resistance to establish said element in a power-receiving relation to said battery to develop a controlled self-heating of said element such that when the electrolyte level is at the top end of said element, the electrolyte acts substantially as a thermal sink and dissipates the heat generated in said element by reason of its circuit connection and such that as the electrolyte level falls below the top end of said element, said element rises in temperature by a predetermined amount due to the heat generated in said element by reason of its circuit connection to cause said source voltage and said battery-charging current to decrease by a corresponding amount.

2. The combination with a regulated battery-charging system including a variable voltage direct current source, means connecting said source in charging relation across a battery, said battery having a cover with the level of battery electrolyte spaced slightly beneath the cover, and means connecting a control circuit across said source for regulating the battery-charging current, said control circuit including a coil connected for sensing and regulating the output voltage of said source and a current-limiting series resistance, the resistance value of said series resistance being substantially larger than the resistance value of said coil and the arrangement being such that a change in a given direction in the output voltage of said source causes a like change in the current through said coil to cause the coil to act upon said source so as to oppose said change; of means for compensating for temperature changes of the battery electrolyte and including a temperature-responsive resistance element having an inverse temperature-resistance coefficient, said element being elongated in a vertical direction and being mounted in solid embedment within an acid-resisting, heat-conducting jacket of plastic material, said jacket having attachment surfaces engaging said cover to suspend the jacket from the cover to position said element with its top end substantially at the electrolyte level so that when the electrolyte temperature changes in a given direction, tending to produce a corresponding change in battery-charging current, the temperature of said element follows the temperature change of the electrolyte and correspondingly changes the current through said coil to regulate the output voltage of said source in a direction opposite to the direction of said electrolyte temperature change, and means including lead wires connected to said element and extending out of said element to connect said element in parallel with a small portion only of said series resistance to establish said element in a power-receiving relation to said battery for developing a controlled self-heating of said element such that when the electrolyte level is at the top end of said element, the electrolyte acts substantially as a thermal sink and dissipates the heat generated in said element by reason of its circuit connection and such that as the electrolyte level falls below the top end of said element, said element rises in temperature by a predetermined amount due to the heat generated in said element by reason of its circuit connection to cause said source voltage and said battery-charging current to decrease by a corresponding amount.

References Cited in the file of this patent

UNITED STATES PATENTS

| | | |
|---|---|---|
| 1,850,449 | Creveling | Mar. 22, 1932 |
| 1,874,163 | Bergvall | Aug. 30, 1932 |
| 2,422,925 | Rady et al. | June 24, 1947 |
| 2,427,729 | Jenkins | Sept. 23, 1947 |

FOREIGN PATENTS

| | | |
|---|---|---|
| 612,972 | Great Britain | Nov. 19, 1948 |
| 691,502 | Great Britain | May 13, 1953 |